United States Patent [19]

Kisuna et al.

[11] 4,043,022

[45] Aug. 23, 1977

[54] METHOD OF MANUFACTURING DOUBLE-STRUCTURE SOUND ABSORBING WALL FOR MOTOR VEHICLE

[75] Inventors: Keiichi Kisuna; Satoru Toyama; Hiroshi Kimura, all of Nagoya, Japan

[73] Assignee: Mitsubishi Jidosha Kogyo Kabushiki Kaisha, Tokyo, Japan

[21] Appl. No.: 736,482

[22] Filed: Oct. 28, 1976

[30] Foreign Application Priority Data

Nov. 17, 1975  Japan .............................. 50-137247
Jan. 9, 1976   Japan .............................. 51-104523
Jan. 9, 1976   Japan .............................. 51-104524
Feb. 9, 1976   Japan .............................. 51-105642

[51] Int. Cl.² .......................... B23P 3/00; B23P 19/04
[52] U.S. Cl. ................................. 29/460; 52/309.11; 264/46.5; 296/70
[58] Field of Search ............... 29/460, 423; 296/70; 52/309.11, 309.04; 264/46.5, 46.7

[56] References Cited

U.S. PATENT DOCUMENTS

| 2,910,730 | 11/1959 | Risch | 264/46.7 X |
| 3,200,026 | 8/1965 | Brown | 29/460 X |
| 3,439,406 | 4/1969 | Wallin | 52/309.04 X |
| 3,717,922 | 2/1973 | Witkowski | 29/460 X |
| 3,811,173 | 5/1974 | Baumann | 29/460 |
| 3,816,837 | 6/1974 | Smith | 264/46.5 X |

Primary Examiner—Charlie T. Moon
Attorney, Agent, or Firm—Oldham & Oldham

[57] ABSTRACT

A method of manufacturing a double-structure sound absorbing wall having a cavity defined by joining first and second plate members, comprising the steps of providing said first and second plate members with gas bleeding holes and recesses depressed toward the inside of said cavity to abut the members to each other, providing a sound insulating member foamable by heat received in said cavity with relief holes for spot-welding corresponding to said cavity, holding said sound insulating member by said recesses upon abutting of said plate members, abutting said peripheral edges to each other, spot-welding said recesses to each other to close said cavity, and foaming said sound insulating member by heating to fill said cavity therewith.

12 Claims, 20 Drawing Figures

METHOD OF MANUFACTURING DOUBLE-STRUCTURE SOUND ABSORBING WALL FOR MOTOR VEHICLE

BACKGROUND OF THE INVENTION

This invention relates to a method of manufacturing a double-structure sound absorbing wall for effectively preventing noise to be propagated to the interior or exterior of a motor vehicle, such as motor car or motor truck. The noise is produced due to vibrations of an engine and auxiliary devices therefor which are mounted in the engine room of the vehicle.

In a conventional construction of the sound absorbing wall, for example a dash panel dividing the compartment and the engine room, a known suitable sound insulating material is simply adhered or fixed to the panel to prevent the propagation of noise. However, such a construction is insufficient to prevent the propagation of noise. In the other construction, a dash panel is a double-structure having a cavity defined by inner and outer plates. Such a dash panel is provided with an opening for inserting a steering shaft and holes for inserting and attaching many kinds of equipments such as a brake master cylinder, and sealing member having a waterproof function is fitted over a joined peripheral portion of the inner and outer plates. However, since the cavity is only formed as a hollow portion, it is difficult to prevent the propagation of noise and vibration of the engine. Also, fitting of the sealing member takes much time, and rust will be appeared on the inner and outer plates by entering of water into the cavity.

SUMMARY OF THE INVENTION

In order to avoid the above drawbacks, this invention provides a method of manufacturing a double-structure sound absorbing wall for a vehicle, said sound absorbing wall having a cavity defined by joining peripheral edges of first and second plate members, said method comprising the steps of providing said first and second plate members with gas bleeding holes and recesses depressed toward the inside of said cavity to abut the members to each other, providing a heat-foamable sound insulating member received in said cavity with relief holes for spot-welding corresponding to said recesses, holding said heat-foamable sound insulating member by said recesses upon abutting of said plate members, abutting said peripheral edges to each other, spot-welding said recesses to each other to close said cavity, and foaming said heat-foamable sound insulating member by heating to fill said cavity therewith.

According to this invention, the double-structure sound absorbing wall closely filled with a sound insulating material can be easily obtained and its sound insulating effect is high. By this structure, vibration insulating effect and strength thereof is increased, and rigidity of dash panel is also increased.

As the space defined in the double-structure wall is closed by a foamable sound insulating material, entering of air and water into the cavity can be prevented to improve the rust proof effect.

BRIEF DESCRIPTION OF THE DRAWINGS

This invention will be explained by way of example with reference to the accompanying drawings, in which.

DESCRIPTION OF THE PREFERRED EMBODIMENTS

Figure 1:
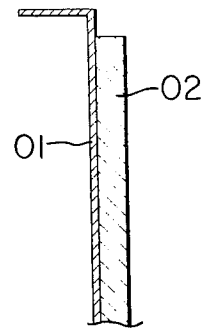
FIG. 1 and 2 are diagrammatic longitudinal sectional views of dash panels of the conventional motor vehicles, respectively.
Figure 2:
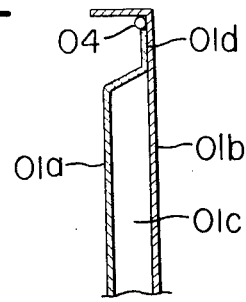

The conventional constructions of the double-structure sound absorbing wall, for example a dash panel dividing the compartment of the vehicle and the engine room are shown in FIGS. 1 and 2. In FIG. 1, the dash panel 01 is provided with a known suitable sound insulating material 02 which is simply adhered or fixed thereto, thereby preventing propagation of noise. The dash panel shown in FIG. 2 is a double structure having an inner plate 01a and an outer plate 01b between which a cavity 01c is defined. A sealing member 04 having a waterproof function is fitted over a joined peripheral portion 01d of the panel.

The method of manufacturing the double-structure sound absorbing wall according to this invention is now explained with reference to FIGS. 3 to 13, but the embodiment described below shows the case in that this invention is applied to the manufacture of the dash panel for the motor vehicle.

Figure 3:
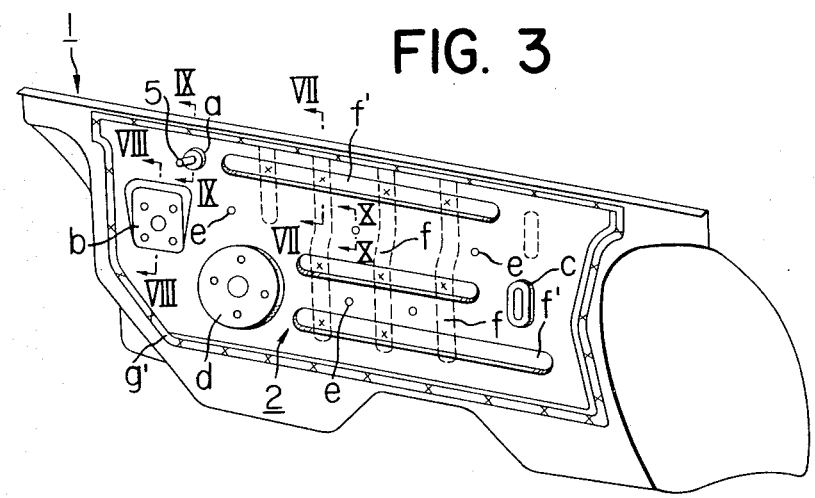
FIG. 3 is a general perspective view of the dash panel according to the invention.
Figure 4:
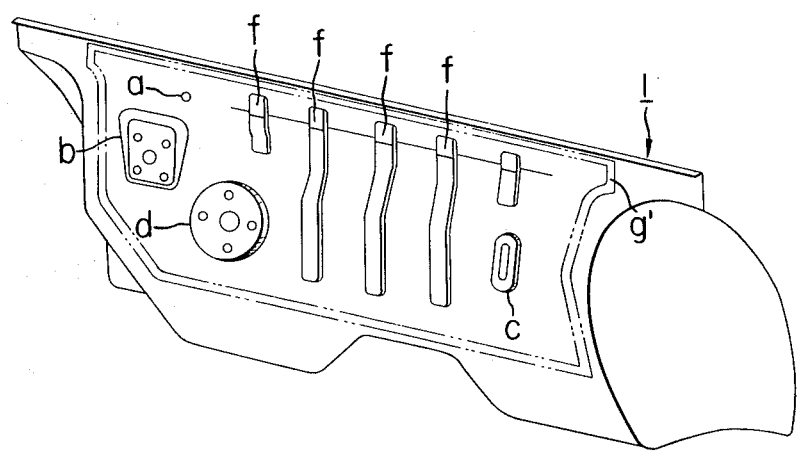
FIG. 4 is a perspective view of an inner panel constituting the dash panel.
Figure 5:
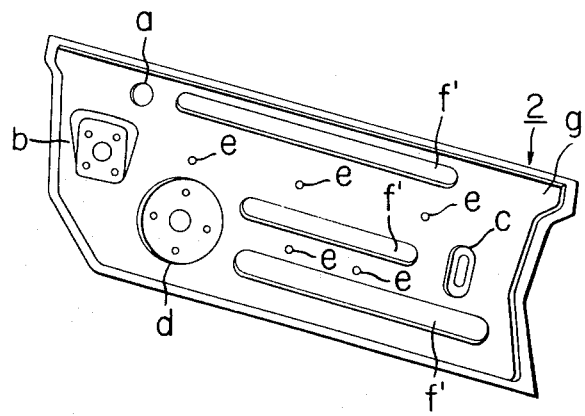
FIG. 5 is a perspective view of an outer panel to which the inner panel is welded from the engine room side.

In FIG. 3, the dash panel of this invention has an inner or main panel 1 forming an inner wall of the dash panel and separating the compartment of the vehicle from the engine room and an outer or secondary panel 2 forming an outer wall of the dash panel. As shown in FIGS. 4 and 5, these panels 1 and 2 are provided with desired holes corresponding with each other, such as a hole *a* for inserting a control cable pipe 5, a hole portion *b* for attaching a brake master cylinder (not shown), a hole *c* for inserting a water hose of a heater, a hole portion *d* for inserting a steering handle shaft, as same as the conventional dash panel. The outer panel 2 is also provided with gas bleeding holes *e*. The inner panel 1 is formed with a plurality of press-formed bead portions *f* which are elongate vertical recesses, and the outer panel 2 is formed with a plurality of press-formed lateral bead portions *f'*. Said plurality of beads *f* and *f'* are depressed so as to abut to each other when the double-structure wall is assebled by said panels 1 and 2. Numeral *g* is an abutting portion formed on the peripheral edge of the outer panel 2, and the inner panel 1 is formed with an abutting portion *g'* corresponding to the abutting portion *g*, as shown in two-dot chain line in FIG. 4.

The dash panel has also a heat-foamable sound insulating material sheet 3 interposed between said panels 1 and 2. As shown in FIG. 3, the sound insulating material sheet 3 is a plate-like sheet of for example foaming rubber or foaming resin. This sheet 3 has a characteristic such that a foaming phenomenon is caused by heating and a volume of the sheet is increased. Also, said heat-foamable sound insulating material sheet is provided with holes corresponding to said holes *a, b, c* and *d* formed in said panels 1 and 2 and relief holes *h* for abutting portions of said press-formed beads *f* and *f'*.

The manufacture of the dash panel formed by the double-structure sound absorbing wall according to the invention is achieved by integrally assemblying said three members 1, 2 and 3 as described below.

Figure 7:
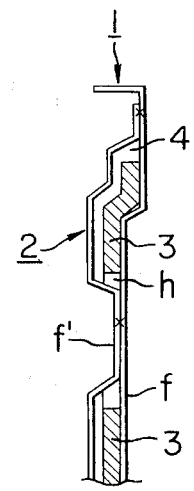
FIG. 7 is an enlarged sectional view taken along the line VII—VII in FIG. 3, before foaming of the sound insulating material sheet, FIG. 7' is a view similar to FIG. 7, after foaming of the sheet.
Figure 6:
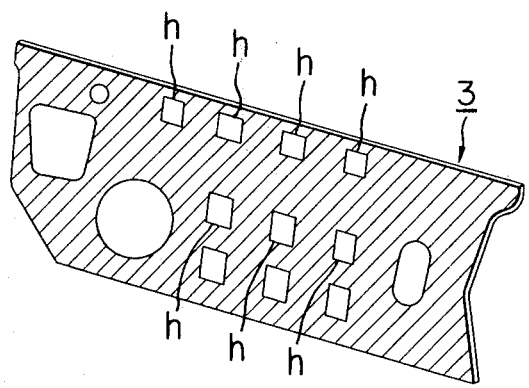
FIG. 6 is a perspective view of a heat-foamable sound insulating material sheet.
Figure 7:
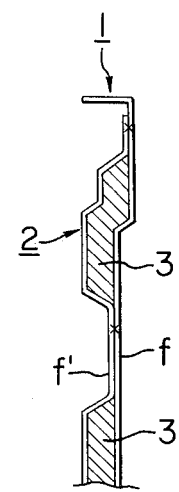
Figure 8:
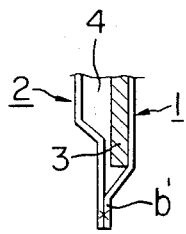
FIG. 8 is a sectional view taken along the line VIII—VIII in FIG. 3, FIG. 8' is a view similar to FIG. 8, after foaming of the sheet.
Figure 8:
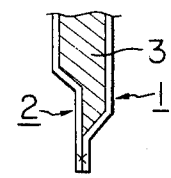
Figure 9:
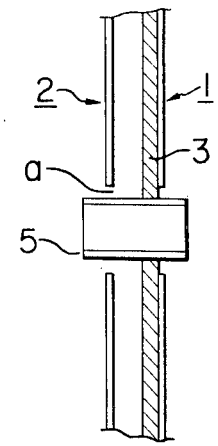
FIG. 9 is a sectional view taken along the line IX—IX in FIG. 3, FIG. 9' is a view similar to FIG. 9, after foaming of the sheet.
Figure 9:
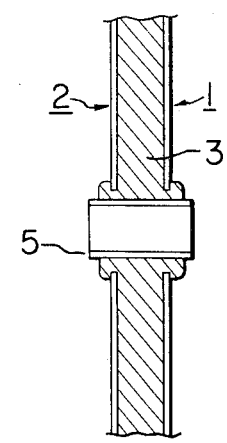
Figure 8:
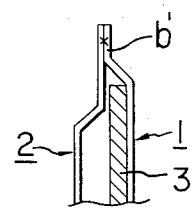
Figure 8:
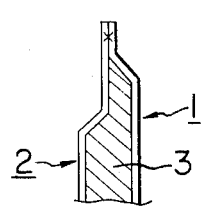
Figure 10:
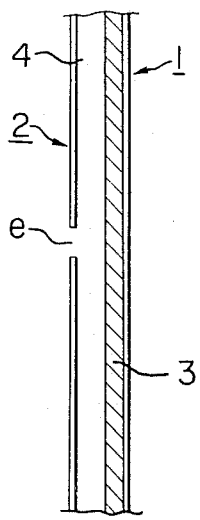
FIG. 10 is a sectional view taken along the line X—X in FIG. 3, before foaming of the sound insulating material sheet, FIG. 10' is a view similar to FIG. 10, after foaming of the sheet.
Figure 10:
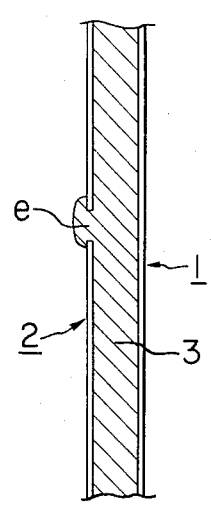

Firstly, the inner panel 1 forming the inner wall and the outer panel 2 forming the outer wall are faced to each other by a suitable means, and the heat-foamable sound insulating material sheet 3 is interposed between said panels 1 and 2. The sheet 3 is retained by the peripheral edges *g* and *g'* of the panels 1 and 2 and a plurality of press-formed bead portions *f* and *f'*. Then, the peripheral edges *g* and *g'* and the press-formed beads *f* and *f'* are joined to each other by way of spot welding respectively, as shown in FIG. 7. Also, the peripheral edges *b'* of the hole portions *b* are spot welded to each other, as shown in FIG. 8. At this time, the control cable pipe 5 is inserted through the hole *a*, as shown in FIG. 9. Thus, the sound insulating material sheet 3 is interposed in the cavity 4 between the inner and outer panels 1 and 2, so that the cavity is substantially closed before the sheet is foamed, as shown in FIGS. 7, 8, 9 and 10.

Then, the integral panel assembly is inserted into a suitable heating means, such as a heating furnace to heat the heat-foamable sound insulating material sheet 3. When heated, the sound insulating material sheet 3 is foamed as shown in FIGS. 7', 8', 9' and 10', and the cavity 4 between the panels 1 and 2 is filled with the sound insulating material, whereby the dash panel of the double-structure sound absorbing wall is completed as shown in FIG. 3. In this case, it is desirable to heat the sheet 3 maintaining its longitudinal sides vertically, whereby uniform foaming of the heat-foamable sound insulating material sheet 3 is established and the cavity 4 between the panels 1 and 2 is securely filled by the foamable sound insulating material.

Figure 11:
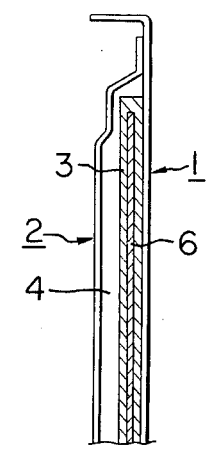
FIG. 11 is a sectional view of a modification of the sound insulating material sheet, before foaming thereof, FIG. 11' is a sectional view of the sound insulating sheet in FIG. 11, after foaming thereof.
Figure 11:
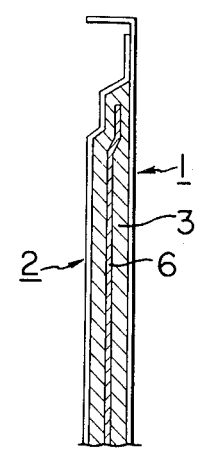

In a modification of the sound insulating material sheet shown in FIG. 11, the heat-foamable sound insulating material sheet 3 contains therein as a core member 6 an industrial waste material such as paint refuse dried and become solid, cast waste sand mainly consisting of silica sand or waste oil having a characteristic that it can mix with the sound insulating material 3. This sound insulating material sheet 3 containing the industrial waste material is foamed as shown in FIG. 11'.

Figure 12:
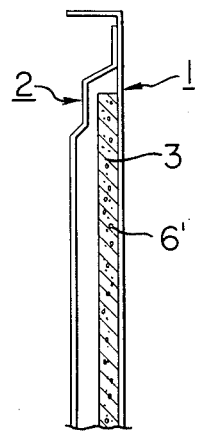
FIG. 12 is a sectional view of another modification of the sound insulating sheet, FIG. 12' is a sectional view of the sound insulating sheet in FIG. 12, after foaming thereof.
Figure 12:
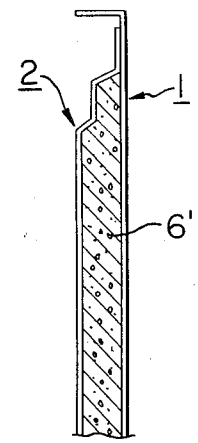

In another modification of the sound insulating material sheet shown in FIG. 12, the cheap material 6' such as the industrial waste material is mixed and scattered in the sound insulating material sheet 3 which is foamed as shown in FIG. 12'.

In these modifications, reduction of production cost is attained.

Figure 13:
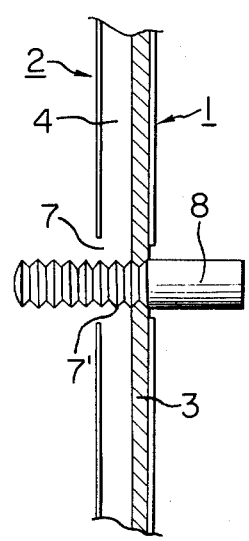
FIG. 13 is a sectional view of a portion of the sound insulating material sheet for inserting an electric wire, before foaming of the sheet, and FIG. 13' is a sectional view showing the electric wire being passed through the sound insulating material sheet in FIG. 13, after foaming thereof.
Figure 13:
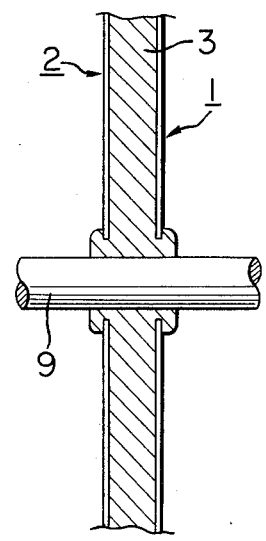

In case that an electric wire is inserted through the hole 7, as shown in FIG. 13, a dummy rod 8 having a diameter substantially same as that of said wire and formed with threads 7' is firstly inserted through the hole 7 before foaming of the sound insulating material sheet 3. After foaming, the dummy rod 8 is screwed out of the hole 7. Then, the electric wire 9 is fitted into the hole 7. Thus, the electric wire 9 is tightly secured and the sealing effect between the wire and the hole will not be decreased. This arrangement is also applied to strengthen fixing of many kinds of control cables and the sheath thereof, in addition to the electric wire. The dummy rod may be formed with annular concave and convex grooves instead of said threads.

The above described embodiments of the double-structure sounds absorbing wall according to this invention is applied to manufacture of the dash panel for the motor vehicle, but it can be also applied to a side panel of the engine compartment or room. Thus, this invention is useful for manufacture of member which requires the sound absorption of the vehicle engine, and it can be applied to the manufacture of the sound absorbing wall of the engine room of the truck.

While one complete embodiment of the invention has been disclosed herein, it will be appreciated that modification of this particular embodiment of the invention may be resorted to without departing from the scope of the invention.

What is claimed is:

1. A method of manufacturing a double-structure sound absorbing wall for a vehicle, said sound absorbing wall having a cavity defined by joining peripheral edges of first and second plate members, said method comprising the steps of providing said first and second plate members with gas bleeding holes and recesses depressed toward the inside of said cavity to abut the members to each other, providing a heat-foamable sound insulating member received in said cavity with relief holes for spot-welding corresponding to said recesses, holding said heat-foaming sound insulating member by said recesses upon abutting of said plate members, abutting said peripheral edges to each other, spot-welding said recesses to each other to close said cavity, and foaming said heat-foamable sound insulating member by heating to fill said cavity therewith.

2. A method according to claim 1, wherein one of said first and second plate members is a main panel separating a compartment from an engine room of the vehicle, the other of said members being a secondary panel.

3. A method according to claim 1, wherein one of said first and second plate members is a main panel separating a compartment from an engine room of the vehicle, the other of said members being a secondary panel, said recesses being press-formed in an elongate shape.

4. A method according to claim 3, wherein said elongate recesses in said first and second plate members are provided to cross each other.

5. A method according to claim 2, wherein said main panel is a dash panel, and further comprising the step of providing said dash panel and said secondary panel with holes for inserting a rod of the devices such as a steering shaft and a brake master cylinder, a control cable and a cord member.

6. A method according to claim 5, further comprising the step of inserting a pipe through one of said holes.

7. A method according to claim 1, wherein said heat-foamable sound insulating member contains an industrial waste material.

8. A method according to claim 7, wherein said industrial waste material is a paint refuse dried and become solid.

9. A method according to claim 7, wherein said industrial waste material is silica sand.

10. A method according to claim 7, wherein said industrial waste material is a waste oil having a characteristic that it can mix with said heat-foamable sound insulating member.

11. A method according to claim 5, further comprising the steps of inserting a dummy rod through one of said holes before foaming of the insulating member, said dummy rod having a diameter substantially same as the cord member and being provided with concave and convex portions, pulling said dummy rod out of said hole after said foaming, and inserting said cord member therethrough.

12. A method according to claim 7, wherein said heat-foamable sound insulating member surrounds the industrial waste material to form a lamination.

* * * * *